Patented July 23, 1929.

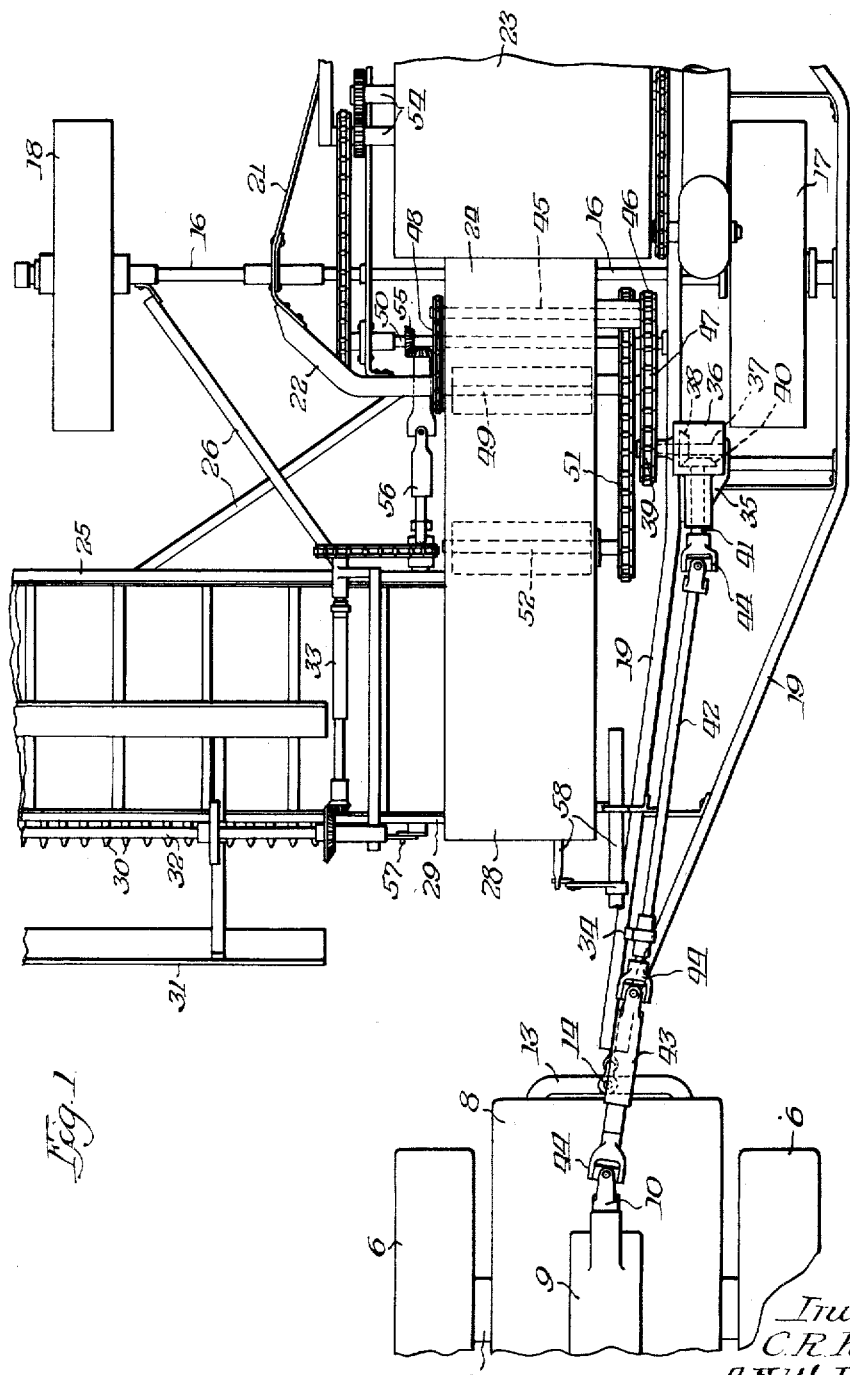

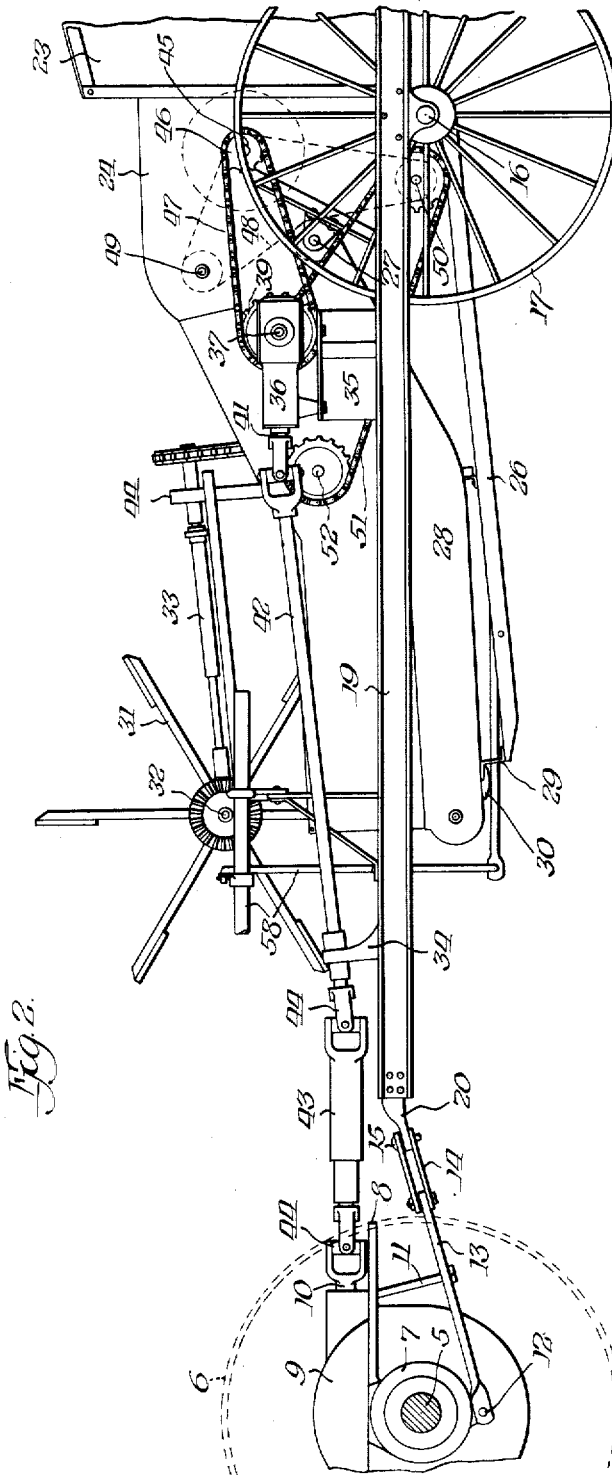

1,721,713

UNITED STATES PATENT OFFICE.

CLEMMA R. RANEY, OF RIVERSIDE, AND ARNOLD E. W. JOHNSON, OF CHICAGO, ILLINOIS, ASSIGNORS TO INTERNATIONAL HARVESTER COMPANY, OF CHICAGO, ILLINOIS, A CORPORATION OF NEW JERSEY.

POWER-TAKE-OFF DRIVEN HARVESTER THRASHER.

Application filed July 26, 1926. Serial No. 124,993.

This invention relates to harvester-thrashers.

As is well known, these machines combine the functions of a harvester header with that of a thrasher, so that the combined structure may travel as a unit and perform the dual function, in one passage through the field, and in a single operation, of reaping and thrashing.

In the past these machines were pulled by draft animals or tractors, and the various operative mechanisms were driven from an engine carried on the machine frame. An engine, of course, adds considerable weight to the machine and makes its travel difficult under certain conditions, as for instance when the fields are sandy.

In this invention the engine on the harvester-thrasher is eliminated and the machine is pulled as well as driven by a tractor.

More particularly, then, this invention relates to a novel power transmitting mechanism which functions to operate the harvester-thrasher from the transmission gearing of the tractor.

Thus, the main objects of the present invention are to provide a lighter and simpler harvester-thrasher; to provide a machine of this kind with an operating connection to a tractor; and, lastly, generally to improve these machines.

In the accompanying sheets of drawings, wherein the same parts are similarly designated, an illustrative embodiment of this invention has been shown.

Figure 1 is a plan view of so much of a tractor and harvester-thrasher as is necessary to illustrate this invention; and Figure 2 is a side elevational view of the same structure.

As has been stated, the harvester-thrasher of this invention is to be drawn as well as driven by a tractor. This tractor is generally shown in Figures 1 and 2, and it will here be seen that only the rear end thereof has been shown, as no more of the same is necessary to this disclosure.

The tractor has a rear axle 5 supported on rear traction wheels 6. There is also shown the usual rear axle housing 7 and operator's platform 8. The tractor is of the type having a longitudinal, centrally and rearwardly extending transmission housing part 9, through which protrudes, rearwardly and centrally, what is here to be termed a power take-off shaft 10, from which power is derived for operating the harvester-thrasher, as will be subsequently explained. This power take-off or shaft extension, it is to be understood, forms a part of the usual sliding gear transmission of a tractor of this type, the transmission being so constructed that the shaft 10 can only be driven in first and second speeds, and never in high or reverse speeds. It will also be observed that this power take-off shaft lies in a plane slightly above the operator's platform 8.

The platform 8 is provided with hangers 11, only one being shown, and the bottom of the rear axle housing 7 is provided with means 12 for supporting a U-shaped draft bar 13, said bar extending rearwardly and upwardly beneath the platform. A coupling device 14 is secured centrally to the rear end of the U-shaped draft bar 13, said device including a removable pin 15 for a purpose soon to appear. The main frame of the harvester-thrasher and its connection to the tractor draw bar will now be described.

Inspection of the drawings shows that the rear part of the harvester-thrasher is carried on a transversely extending axle 16 which is supported at its stubbleward end by a main wheel 17 and, at its grainward end, by a grain wheel 18. At its stubbleward end the axle rigidly carries a pair of longitudinally extending, forwardly converging frame sills or bars 19. Where these sills converge, they are connected by a block 20, embodying an eyed extension which fits in the clevis 14 and is pivotally connected thereto by the pin 15, as will be understood. In this manner, the machine may be connected to and be drawn by the tractor. It can also be seen that the tractor supports the front end of the harvester-thrasher.

The main frame of the harvester-thrasher also embodies another longitudinal frame sill 21, suitably cross braced by a transverse bar 22. These members with the grainward sill 19, heretofore mentioned, support and carry a thrasher or separator housing 23, forwardly of which is carried the usual thrashing cylinder housing 24.

A conventional harvester header embodying a transversely arranged platform 25 is pivotally supported from the axle 16 by means of supporting bars 26. Pivotally hung on a shaft 27 is a forwardly extending feeder housing 28 which receives the cut grain from the platform and feeds it into the cylinder housing 24, as is well known in this art. As clearly illustrated, the front end of this feeder housing rests on the stubbleward end of the platform frame represented by a Z-bar 29.

The header also includes cutting mechanism 30 and a reel 31 whose shaft 32 is suitably supported on the platform frame and geared to an extensible shaft 33, as shown.

The frame bars 19 carry a front bracket 34 and a rear bracket 35, the rear bracket supporting a gear casing 36 in which is journaled a transverse stub shaft 37 carrying a bevel gear 38 inside the casing and at the outside of the casing a sprocket wheel 39. By means of a meshing bevel gear 40 in said casing on a longitudinal stub shaft 41, these parts are operatively connected to the power take-off shaft 10 by means of a straight tumbler shaft 42 journaled in the front bracket 34, and a telescopic or extensible shaft 43. The shafts 10, 43 and 42 are all connected by the universal joints 44, shown.

In the housing 24 is a transverse thrashing cylinder shaft 45, carrying on its stubbleward end a sprocket wheel 46 connected by a chain 47 to the sprocket wheel 39. At its grainward end, the cylinder shaft 45 is connected by a chain 48 to drive a beater shaft 49 and a second shaft 50. This shaft 50 at its stubbleward end is connected by a chain 51 to drive a second beater shaft 52 while at its grainward end it is chain connected by a chain 53 to drive the shafts 54, which operate mechanism in the body of the separator. The shaft 50 also carries a gear 55 which drives a shaft 56 to impart rotation to the reel shaft 33, as shown, and to the cutting mechanism 30, by means of the pitman 57.

Any suitable means, such as indicated at 58, may be provided for holding the header platform in vertically adjusted position, as is usual in these machines.

In operation, it can now be appreciated, that the power take-off shaft 10, through the shafts 43 and 42, drives the shaft 37 which is connected to drive the thrashing cylinder, and that all other operative mechanisms of the thrasher and harvester are geared to be driven from this cylinder shaft. It is also to be observed that this shafting 10, 43 and 42 operates in substantially a line with the thrashing cylinder shaft and, as a result, the application of power from the tractor to the thrashing cylinder will be even and uniform. Furthermore, the telescopic shaft 43 and universal joint connections 44 are so disposed with respect to the pin connection 15 of the machine to the tractor draw bar 13 that easy turning of corners in the field is possible. Still another important feature is in the direct connection of the machine to the draw bar, whereby the tractor serves as a support for the front end of the machine.

With all of the desirable objects of this invention thus attained, it should now be understood that the structure thereof is capable of changes and modifications and that it is the intention to cover all such changes which do not depart from the spirit and scope of this invention as hereinafter claimed.

What we claim is:

1. A harvester-thrasher having a rigid main frame adapted to be pivotally connected to the draw bar of a tractor, said tractor also having a power take-off shaft, a thrashing cylinder shaft on the main frame, a straight tumbler shaft supported on said main frame and connected at its rear end to drive said cylinder shaft, and a telescopic shaft flexibly adapted to connect the take-off and tumbler shafts, said telescopic shaft adapted to span the pivotal connection of the harvester-thrasher to the tractor draw bar.

2. A harvester-thrasher having a main frame adapted to be directly connected to the draw bar of a tractor, said tractor being of the type having a power take-off shaft disposed above a platform, said main frame adapted to lie in substantially the same horizontal plane with said tractor platform, a thrasher including a cylinder shaft carried on the main frame, and flexible driving connections adapted to connect the take-off shaft to the cylinder shaft, said connections adapted to be supported above the tractor platform and on the harvester-thrasher main frame.

3. A harvester-thrasher having a rigid main frame adapted to be connected to the draw bar of a tractor having a power take-off shaft, a thrashing cylinder shaft carried in a housing on said frame, a gear housing carried on said frame, gearing therein operatively connected to drive the cylinder shaft, a tumbler shaft operating the gearing in the housing, and an extensible shaft adapted to connect the tumbler and take-off shafts.

4. The combination with a tractor having a draw bar, an operator's platform and a transmission power take-off shaft extending rearwardly from the tractor above said platform, of a harvester-thrasher having a rigid main frame connected directly to the tractor draw bar, a thrasher housing including a cylinder shaft on the said frame, gearing carried above said frame operatively connected to said cylinder shaft, a tumbler shaft carried above the frame for driving said gearing, and an extensible shaft connecting the take-off shaft with the tumbler shaft.

5. The combination with a tractor having a draw bar and a transmission power take-off shaft extending rearwardly from the tractor, of a harvester-thrasher having a frame, said harvester-thrasher including a thrasher part and a harvester part, a cylinder shaft in the thrasher part, gearing on the frame operatively connected to said cylinder shaft, a tumbler shaft on the frame for driving said gearing, an extensible shaft connecting the take-off shaft with the tumbler shaft, and driving connections from the cylinder shaft for operating the harvester part and other operative parts of the thrasher part.

6. A harvester-thrasher having a main frame including a forward extension adapted for connection to the draw bar of a tractor, said tractor including a power take-off shaft, a transverse thrashing cylinder shaft on the main frame, a transverse stub shaft on the frame, gearing connecting the stub and cylinder shafts, and shafting including universal joints therein, said shafting carried on the forward frame extension and driving the stub shaft through suitable gearing and adapted for connection to the tractor power take-off shaft.

7. A harvester thrasher having a main frame including a forward extension adapted for pivotal connection to the draw bar of a tractor, said tractor including a power take-off shaft disposed higher than the tractor draw bar, a transverse thrashing cylinder shaft on the main frame, a gear box on the main frame including driving connections for driving the cylinder shaft, shafting journaled on the forward extension and in the gear box for driving said driving connections, said shafting adapted for connection to the tractor power take-off shaft and made flexible by the inter-position therein of at least three universal joints.

8. A harvester thrasher having a main frame including a forward extension adapted for pivotal connection to the draw bar of a tractor, said tractor including a power take-off shaft disposed higher than the tractor draw bar, a transverse thrashing cylinder shaft on the main frame, gearing on the main frame connected to drive the cylinder shaft, shafting journaled on the forward extension of the main frame for operating said gearing, said shafting adapted for connection to the tractor power take-off shaft and including a telescopic portion adapted to span the pivotal connection of the harvester-thrasher main frame to the tractor draw bar, a universal joint at the front end of said telescopic shaft portion, and another universal joint at the rear end of said telescopic portion.

In testimony whereof we affix our signatures.

CLEMMA R. RANEY.
ARNOLD E. W. JOHNSON.

CERTIFICATE OF CORRECTION.

Patent No. 1,721,713.    Granted July 23, 1929, to

CLEMMA R. RANEY ET AL.

It is hereby certified that error appears in the printed specification of the above numbered patent requiring correction as follows: Page 2, strike out lines 112 to 130, and page 3, strike out lines 1 to 8, comprising claims 4 and 5, respectively; page 3, lines 9, 22, and 37, for claim numbers "6, 7 and 8" read "4, 5 and 6"; and that the said Letters Patent should be read with these corrections therein that the same may conform to the record of the case in the Patent Office.

Signed and sealed this 18th day of February, A. D. 1930.

(Seal)

M. J. Moore,
Acting Commissioner of Patents.

thrasher part, gearing on the frame operatively connected to said cylinder shaft, a tumbler shaft on the frame for driving said gearing, an extensible shaft connecting the take-off shaft with the tumbler shaft, and driving connections from the cylinder shaft for operating the harvester part and other operative parts of the thrasher part.

6. A harvester-thrasher having a main frame including a forward extension adapted for connection to the draw bar of a tractor, said tractor including a power take-off shaft, a transverse thrashing cylinder shaft on the main frame, a transverse stub shaft on the frame, gearing connecting the stub and cylinder shafts, and shafting including universal joints therein, said shafting carried on the forward frame extension and driving the stub shaft through suitable gearing and adapted for connection to the tractor power take-off shaft.

7. A harvester thrasher having a main frame including a forward extension adapted for pivotal connection to the draw bar of a tractor, said tractor including a power take-off shaft disposed higher than the tractor draw bar, a transverse thrashing cylinder shaft on the main frame, a gear box on the main frame including driving connections for driving the cylinder shaft, shafting journaled on the forward extension and in the gear box for driving said driving connections, said shafting adapted for connection to the tractor power take-off shaft and made flexible by the inter-position therein of at least three universal joints.

8. A harvester thrasher having a main frame including a forward extension adapted for pivotal connection to the draw bar of a tractor, said tractor including a power take-off shaft disposed higher than the tractor draw bar, a transverse thrashing cylinder shaft on the main frame, gearing on the main frame connected to drive the cylinder shaft, shafting journaled on the forward extension of the main frame for operating said gearing, said shafting adapted for connection to the tractor power take-off shaft and including a telescopic portion adapted to span the pivotal connection of the harvester-thrasher main frame to the tractor draw bar, a universal joint at the front end of said telescopic shaft portion, and another universal joint at the rear end of said telescopic portion.

In testimony whereof we affix our signatures.

CLEMMA R. RANEY.
ARNOLD E. W. JOHNSON.

CERTIFICATE OF CORRECTION.

Patent No. 1,721,713.   Granted July 23, 1929, to

CLEMMA R. RANEY ET AL.

It is hereby certified that error appears in the printed specification of the above numbered patent requiring correction as follows: Page 2, strike out lines 112 to 130, and page 3, strike out lines 1 to 8, comprising claims 4 and 5, respectively; page 3, lines 9, 22, and 37, for claim numbers "6, 7 and 8" read "4, 5 and 6"; and that the said Letters Patent should be read with these corrections therein that the same may conform to the record of the case in the Patent Office.

Signed and sealed this 18th day of February, A. D. 1930.

(Seal)

M. J. Moore,
Acting Commissioner of Patents.